United States Patent Office 3,425,850
Patented Feb. 4, 1969

3,425,850
METHOD FOR PREPARING A DEHYDRATED MEAT PRODUCT
Jack Palmer Savage, Biddenham, and Raymond Chenneour, Durham, England, assignors to Lever Brothers Company, New York, N.Y., a corporation of Maine
No Drawing. Filed Apr. 16, 1965, Ser. No. 448,844
Claims priority, application Great Britain, Apr. 22, 1964, 16,717/64
U.S. Cl. 99—208                                    2 Claims
Int. Cl. A23b *1/04, 3/04*

ABSTRACT OF THE DISCLOSURE

Meat products are dehydrated by distributing amylose starch throughout the product, hydrating the starch by heating in the presence of moisture to a temperature of at least 70° C., retrograding the starch by cooling to a temperature below −1° C., and air-drying the product at a temperature not exceeding 50° C.

---

This invention relates to the treatment of foodstuffs, especially meat products.

The invention provides a method of making a dehydrated meat product, in which the meat that is dehydrated contains starch that has been subjected to retrogradation.

By "meat" is meant the flesh of animals, poultry, fish and crustacea.

The invention is applicable to both intact and comminuted meat. When the meat is substantially intact, that is, in the form of large pieces or slices, the starch may conveniently be distributed in the meat by injecting the starch in the form of an aqueous slurry or solution. It is desirable that distribution of the starch should be substantially uniform throughout the meat, and the preferred method of injecting the starch is by using a multiple injection apparatus employing a battery of perforate needles.

When the invention is applied to comminuted meat the starch is conveniently incorporated in the meat by simple mixing, preferably as an aqueous slurry or solution.

The type of starch used according to the invention must be capable of retrogradation. By "retrogradation" we mean irreversible gellation due to the association of starch molecules that occurs when the starch is heated and is subsequently cooled. A suitable starch should contain a substantial content of amylose. By "substantial content" we mean that the content of amylose is sufficient to provide a matrix upon retrogradation that is capable of reducing collapse of the meat when it is dehydrated.

Particularly suitable starches for use according to the invention are cereal starches, such as those derived from wheat and corn, and root starches, such as tapioca and arrowroot. Other suitable retrogradable starches may also be used.

The starch is added to the meat in an amount forming at least about 1% by weight of the total water content of the meat before drying. More suitably it is present in an amount forming about 2% to 15%, preferably 2% to 10% and more preferably 3% to 8% by weight of the total water content of the meat. It is more convenient to calculate the amount of the starch to be added in terms of the weight of raw wet meat. Usually the starch will be added in an amount forming about 2% to 6% by weight of the raw wet meat, although when it is incorporated in the meat by admixture, for example in the preparation of hamburger mixes, it will usually be higher than this—for example, 6% to 10% by weight of the raw wet meat.

When using certain techniques, for example injection, it might be difficult to get more than about 6% of starch by weight in the meat; the man skilled in the art, however, will have no difficulty in determining the amount of starch that can be added to the meat by any given process. When the starch is added to comminuted meat by simple admixture, any desired proportion of starch may be incorporated in the product. Starch is preferably incorporated into meat in the form of a suspension of uncooked starch in a solution of cooked starch.

In addition to the starch other additives may also be incorporated in the meat, for example, flavouring materials, anti-oxidants, curing salts, binders (particularly to improve the texture of comminuted meat products) artificial colourants, etc. Suitable binders include sodium caseinate, gelatine and alginate.

Retrogradation of the starch in the meat is preferably brought about by heating it to above 70° C., preferably to above 85° C., cooling to a temperature at which water in the meat freezes, and subsequently warming to about room temperature. Alternatively retrogradation may be achieved by first heating the starch to at least 70° C., preferably to above 85° C., and then introducing it into the meat which is frozen and subsequently thawed.

It is desirable that during the cooling step the starch in the meat should be held at a temperature below −1° C., preferably between −1° C. and −10° C., for at least half an hour, and preferably for not less than two hours. It has been found that slow cooling gives better product than does rapid cooling. The meat product containing starch may therefore conveniently be held in a still air freeze at about −10° C. air temperature until the product is completely frozen. When rapid cooling is for some reason preferred, subsequent warming to a temperature above 0° C. is preferably slow.

The meat product containing the retrograded starch may be dried by air drying. It is preferred that the temperature at which drying take place should preferably not exceed 50° C.

The invention is further illustrated by the following Examples.

Example 1

Raw chicken meat was milled to a fine paste in a colloid mill. The carcass was stripped of remaining meat by heating it in an autoclave, and the meat so removed from the carcass was coarsely shredded.

The meat so obtained, and the cooking liquor were thoroughly mixed with other ingredients, including starch (in the form of cornflour) to give a mix having the following composition.

| Ingredient: | Parts by weight |
|---|---|
| Milled raw meat | 26.50 |
| Milled chicken fat [1] | 11.10 |
| Cooking liquor [1] | 20.00 |
| Shredded cooked meat | 38.50 |
| Starch (cornflour) | 1.90 |
| Monosodium glutamate | 0.49 |
| Salt | 0.44 |
| Tenox II [2] | 0.07 |
|  | 100.00 |

[1] Additions made to bring protein and fat contents of the milled meat to approximately 11% and 25% respectively.
[2] A propylene glycol solution of butylated hydroxyanisole plus propyl gallate and citric acid as synergists.

This mix was put into moulds and set by immersing the moulds into boiling water until the temperature at the centre of the mix exceeded 80° C.

The moulded meat products so obtained were then cooled to −290° C. during 12 hours, and then allowed to rise to room temperature during the following 8 hours.

The thawed blocks were removed from the moulds, sliced into slices 3 mm. thick and dried in a through-draught drier at 40–50° C.

Dried slices of meat, obtained as described above, were rehydrated in boiling water (one part of dry meat: 10 parts water) for 10 minutes. The rehydrated product had good flavour and texture.

Example 2

A ham-like product was obtained using the process of Example 1, except that the ham-containing mix employed had the following composition:

| Ingredient: | Parts by weight |
|---|---|
| Milled raw pork (spare ribs)[1] | 38.60 |
| Cooking liquor | 17.50 |
| Cooked shredded pork | 37.50 |
| Glucose | 0.25 |
| Sucrose | 0.25 |
| Curing salt (99% NaCl; 1% $NaNO_2$) | 3.00 |
| Starch (cornflour) | 2.00 |
| Ascorbic acid | 0.20 |
| Citric Acid | 0.10 |
| Tenox II | 0.10 |

[1] Adjusted with cooking liquors to 11% protein and between 15% and 20% fat.

On rehydration as described in Example 1, the product had good appearance and texture.

Example 3

A block of beef topside (weight 5 kg.) was divided into three approximately equal portions, A, B, and C. These portions were treated as described in (a), (b) and (c) below.

(a) Block A was cooked in boiling water until the temperature at the centre of the block reached 85° C. It was then removed from the water, cooled and weighed.

(b) Block B was injected (1.25 cm. grid) with a 6% w./w. suspension of raw corn starch in a 5% w./w. cooked starch paste (whereby the weight of the block increased by 30%). This resulted in an uptake, expressed in terms of the weight of B before injection, of 2% of raw starch and 1.6% of cooked starch.

After injection, block B was cooked, cooled and weighed as described in (a).

(c) Block C was treated according to the invention. It was treated exactly as described for block B, and immediately after cooling and weighing was frozen overnight (about 12 hours) to −20° C. It was allowed to thaw to 18° C. during the ensuing 6 hours.

All three blocks (A and B after cooking and C after freezing and thawing) were then cut into slices 3 mm. thick and dried in a through-draught air drier for 3½ hours at 50° C.

Visual examination showed that the slices from block A were shrunken and dark in colour with a dense texture. The slices from B were little better than those from A, but those from C were light in colour, they showed substantially no shrinkage, and had an open porous texture.

The dehydrated slices from blocks A, B and C were then rehydrated in boiling water. On a tenderness scale of 0=very tough to 3=very tender, a taste panel assessment gave the following result:

A—0.14.
B—1.0.
C—2.42.

The overall yield of the meat upon rehydration, expresed as a percentage of the weight of untreated raw meat and corrected for starch content, was 49.2% for A, 50.1% for B and 55.5% for C.

Example 4

Cod fillets were boiled in water for 20 minutes and shredded coarsely in a dough mixer. Raw cod was minced through a plate having 8 mm. diameter holes. The cooked and uncooked fish flesh so obtained was then mixed with starch and water in the following proportions:

| | Percent |
|---|---|
| Shredded cooked cod | 50.0 |
| Raw minced cod | 25.0 |
| Starch | 10.0 |
| Water | 15.0 |

This mix was formed into "fingers" about 10 cm. x 3 cm. x 1.5 cm. in size; these were then steam blanched for 6 minutes and cooled by spraying with cold water for 4 minutes. The fingers were divided into two lots A and B.

Lot A was dehydrated in a through-draught dried at 50° C. immediately after cooling.

Lot B was frozen at −20° C. for 16 hours, then dehydrated in a through-draught drier at 50° C.

Rehydration of the fish fingers was by soaking in cold water for 5 minutes. The rehydrated fish were drained of excess water, covered in batter and fried for 2 minutes in hot fat.

Rehydration yields were as follows (expressed as a percentage on the raw mix):

A—42.1%.
B—85.5%.

The fish fingers in Lot B were more juicy and tender than those of Lot A.

Example 5

Forequarter beef was minced through a plate having 5 mm. diameter holes and from it a meat mix was prepared having the following composition.

| | Percent |
|---|---|
| Minced beef | 73.5 |
| Starch (cornflour) | 10.0 |
| Water | 14.0 |
| Salt | 0.75 |
| Protex[1] (protein hydrolysate flavouring) | 0.75 |
| Onion powder | 0.5 |
| Monosodium glutamate | 0.25 |
| Colour (0.1% sodium nitrite, 0.1% caramel) | 0.25 |
| Antioxidant | 0.02 |

[1] Trademark.

The mix so obtained was moulded into balls of 1.25 to 1.75 cm. diameter. The balls were steam blanched for six minutes, then cooled by spraying with cold water for 4 minutes.

The cooled balls were divided into two lots A and B.

Lot A was dried in a through-draught drier at 50° C. for 24 hours immediately after cooling.

Lot B was frozen for 16 hours at −20° C. before drying in a through-draught drier and 50° C. for 24 hours.

The meat balls were rehydrated in boiling water for 10 minutes. Those from Lot A had poor rehydration characterisics, with an overall rehydrated yield (expressed as a prercentage of the raw mix) of only 50.5%. Those from Lot B were fully rehydrated with an overall rehydrated yield (expressed as percentage of the raw mix) of 98.5%.

Example 6

Dehydrated hamburgers were prepared using a mix similar to that used in Example 5, differing only in the flavouring used. The mix was formed into discs 7.5 cm. in diameter and 1.25 cm. thick, and these were divided into two lots A and B and treated similarly to the beef balls.

The dehydrated hamburgers were rehydrated by soaking in cold water for 15 minutes, then fried for 1 minute each side in hot fat.

Lot A did not rehydrate fully during this treatment, but Lot B did, and gave a succulent tender product which was much preferred to A.

What is claimed is:

1. A method for preparing a dehydrated meat product comprising the steps of:
   (a) distributing substantially uniformly throughout raw meat an amylose startch in a concentration of from 2% to 10% by weight of the raw meat,
   (b) hydrating the starch in the starch-containing meat by heating the starch-containing meat to a temperature of at least 70° C.,
   (c) retrograding the starch in the starch-containing meat by cooling the starch-containing meat to a temperature below minus 1° C., and
   (d) air-drying the retrograded starch-containing meat by a current of air having a temperature not exceeding 50° C. whereby said retrograded starch reduces collapse of the meat when it is dehydrated.

2. A method for preparing a dehydrated meat product comprising the steps of:
   (a) hydrating an amylose starch by heating the starch in the presence of water to a temperature of at least 70° C.,
   (b) distributing the hydrated starch substantially uniformly throughout raw meat in a concentration of from 2% to 10% by weight of the raw meat,
   (c) retrograding starch in the starch-containing meat by cooling the starch-containing meat to a temperature below minus 1° C., and
   (d) air-drying the retrograded starch-containing meat by a current of air having a temperature not exceeding 50° C. whereby said retrograded starch reduces collapse of the meat when it is dehydrated.

References Cited

UNITED STATES PATENTS

| | | | |
|---|---|---|---|
| 2,442,928 | 6/1948 | MacMasters et al. | 99—139 |
| 3,080,809 | 3/1963 | Harris et al. | |
| 3,150,985 | 9/1964 | Buscemi et al. | 99—209 X |
| 3,166,423 | 1/1965 | Sleeth et al. | 99—107 |
| 3,201,260 | 8/1965 | Asselbergs | 99—209 |
| 3,241,982 | 3/1966 | Shank | 99—208 |

HYMAN LORD, Primary Examiner.

U.S. Cl. X.R.

99—299

UNITED STATES PATENT OFFICE
CERTIFICATE OF CORRECTION

Patent No. 3,425,850                                                         February 4, 1969

Jack Palmer Savage et al.

It is certified that error appears in the above identified patent and that said Letters Patent are hereby corrected as shown below:

Column 3, line 2, "-290° C." should read -- -29° C. --. Column 3, line 45, "1.6%" should read -- 1.67% --.

Signed and sealed this 31st day of March 1970.

(SEAL)
Attest:

Edward M. Fletcher, Jr.                                        WILLIAM E. SCHUYLER, JR.
Attesting Officer                                                         Commissioner of Patents